(12) United States Patent
Tang et al.

(10) Patent No.: US 10,734,867 B2
(45) Date of Patent: Aug. 4, 2020

(54) HIGH THERMAL CONDUCTIVITY STATOR COMPONENT FOR VEHICLE MOTOR BASED ON 3D PHASE CHANGE HEAT PIPE TECHNOLOGY

(71) Applicant: SOUTH CHINA UNIVERSITY OF TECHNOLOGY, Guangzhou, Guangdong (CN)

(72) Inventors: Yong Tang, Guangdong (CN); Yalong Sun, Guangdong (CN); Wei Yuan, Guangdong (CN); Longsheng Lu, Guangdong (CN); Zongtao Li, Guangdong (CN); Zhenping Wan, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 16/435,490

(22) Filed: Jun. 8, 2019

(65) Prior Publication Data
US 2019/0326797 A1 Oct. 24, 2019

Related U.S. Application Data

(63) Continuation of application No. PCT/CN2016/110549, filed on Dec. 16, 2016.

(30) Foreign Application Priority Data

Dec. 14, 2016 (CN) .......................... 2016 1 1156165

(51) Int. Cl.
*H02K 9/20* (2006.01)
*F28D 15/04* (2006.01)
*H02K 5/18* (2006.01)

(52) U.S. Cl.
CPC ............... *H02K 9/20* (2013.01); *F28D 15/04* (2013.01); *H02K 5/18* (2013.01)

(58) Field of Classification Search
CPC .. H02K 9/20; H02K 5/18; F28D 15/04; Y02T 10/641
See application file for complete search history.

(56) References Cited

U.S. PATENT DOCUMENTS

| 3,681,628 A | * | 8/1972 | Krastchew | ............. | H02K 9/005 |
| | | | | | 310/54 |
| 7,592,723 B2 | | 9/2009 | Mukai et al. | | |

(Continued)

FOREIGN PATENT DOCUMENTS

| CN | 101145712 A | 3/2008 |
| CN | 201230257 Y | 4/2009 |

(Continued)

*Primary Examiner* — Naishadh N Desai
(74) *Attorney, Agent, or Firm* — Wayne & Ken, LLC; Tony Hom

(57) ABSTRACT

A high thermal conductivity stator component for vehicle motor based on 3D phase change heat pipe technology of the present invention includes a casing, a 3D phase change heat pipe, a stator core and a stator winding; the casing includes assembly passages for the 3D phase change heat pipe; the 3D phase change heat pipe assembly passages are symmetrically arranged on both sides of the casing body; a condensation section of the 3D phase change heat pipe is assembled in the assembly passages of the casing body, and an evaporation section is bonded to the stator winding. The present invention provides a high thermal conductivity stator component for vehicle motor with a simple structure, convenient installation, wide application and low cost.

7 Claims, 4 Drawing Sheets

(56) References Cited

U.S. PATENT DOCUMENTS

| | | | | |
|---|---|---|---|---|
| 7,906,878 B2* | 3/2011 | Fleming | ............ | H02K 9/22 |
| | | | | 310/216.119 |
| 2007/0069593 A1* | 3/2007 | Vasilescu | ............ | F28D 15/0233 |
| | | | | 310/54 |
| 2012/0299401 A1* | 11/2012 | Prucher | ............ | H02K 3/47 |
| | | | | 310/43 |
| 2018/0216617 A1* | 8/2018 | Fukasaku | ............ | H02K 11/33 |

FOREIGN PATENT DOCUMENTS

| | | |
|---|---|---|
| CN | 101958590 A | 1/2011 |
| CN | 103683676 A | 3/2014 |
| CN | 105515227 A | 4/2016 |
| CN | 105591499 A | 5/2016 |
| CN | 206272365 U | 6/2017 |

\* cited by examiner

HIGH THERMAL CONDUCTIVITY STATOR COMPONENT FOR VEHICLE MOTOR BASED ON 3D PHASE CHANGE HEAT PIPE TECHNOLOGY

CROSS-REFERENCE TO RELATED APPLICATIONS

This application is a continuation of International Application No. PCT/CN2016/110549, filed on Dec. 16, 2016, which claims priority from Chinese Patent Application No. 201611156165.3, filed on Dec. 14, 2016, both of which are hereby incorporated by reference in their entireties.

TECHNICAL FIELD

The present invention relates to the field of key components of new energy vehicles, and in particular to a high thermal conductivity stator component for vehicle motor, in which a 3D phase change heat pipe is used for uniformly transferring heat to a whole casing for natural air cooling, forced air cooling or forced water cooling, where the heat is generated by a stator winding which is a main heat-generating component in the vehicle motor.

BACKGROUND OF THE PRESENT INVENTION

Presently, with the exhaustion of fossil energy, the industrial transformation and upgrading of new energy vehicles have become the next important strategic measure for all countries in the world. Performance of the drive motor, which is a core component for a new energy vehicle, has a direct and extremely important impact on the new energy vehicle. For a permanent magnet synchronous motor, its stator winding is the main heat-generating component. Under excessive temperature rise, the motor efficiency and insulation life will be reduced and the local structural deformation of the motor will be caused. Furthermore, since the internal permanent magnet material of the motor generally has a high temperature coefficient and poor thermal stability, excessive temperature rise leads to irreversible demagnetization of permanent magnet. Therefore, it is necessary to pay attention to controlling the thermal load of the motor.

However, the main heat-generating components in the drive motor of the new energy vehicle are the stator winding and the stator core, and the heat transfer paths of the two are mainly dependent on the contact between the stator core and the casing. Therefore, generally, limited by the installation position, the outlet manner, and the material cost, the contact area is only one-third to one-half of the inner wall surface area of the motor casing and the remaining area is not effectively utilized, causing the temperature at the local part of the motor casing to be too high and the temperature gradient to be too large. As such, the heat dissipation effect of the motor cooling structure cannot be well utilized, which in turn affects the temperature control performance of the drive motor. This problem needs to be solved urgently.

In view of the current situation, the present invention discloses a high thermal conductivity stator component for vehicle motor based on 3D phase change heat pipe technology. By assembling the 3D phase change heat pipe between the motor casing and the stator winding, the heat is rapidly diffused from the local high temperature position of the stator winding to the low temperature position of the casing, such that the heat is quickly extracted. Thereby, the overall heat exchange efficiency of the motor is enhanced and the temperature control performance of the drive motor is improved.

SUMMARY OF THE PRESENT INVENTION

The object of the present invention is to overcome the heat dissipation problem in the prior art. A high thermal conductivity stator component for vehicle motor based on 3D phase change heat pipe technology with better heat equalizing effect, better heat dissipation effect, simple structure, long service life, convenient installation and low cost is proposed.

The present invention is achieved at least by one of the following technical solutions.

A high thermal conductivity stator component for vehicle motor based on 3D phase change heat pipe technology includes a casing, a 3D phase change heat pipe, a stator core and a stator winding.

The high thermal conductivity stator component for vehicle motor based on 3D phase change heat pipe technology includes a fin set casing, a 3D phase change heat pipe, a stator core and a stator winding; the fin set casing includes a casing body, a heat dissipating fin set, and assembly passages for the 3D phase change heat pipes; the casing body is annular, and the heat dissipating fin set is uniformly arranged on an outer surface of the casing body in a circumferential direction; the stator core and the stator winding are located on an inner surface of the casing body; the 3D phase change heat pipe includes a condensation section and an evaporation section, where the condensation section is assembled in the assembly passages of the casing body, and the evaporation section is wound around an outside of the stator winding and is bonded to the stator winding; the number of the assembly passages of the 3D phase change heat pipe is more than one.

Further preferably, the fin set casing is formed with aluminum or steel material by an integrated casting or extrusion modeling process.

Further preferably, the assembly passages for the 3D phase change heat pipe are in a blind hole structure, which are symmetrically arranged on both sides of the casing body and have a circular, rectangular and curved cross section. The 3D phase change heat pipe may be a cylindrical heat pipe, a curved heat pipe, a rectangular heat pipe or the like, and the 3D phase change heat pipe is closely matched with the assembly passages.

Further preferably, a sheet with high thermal conductivity and high insulation performance is inserted between the evaporation section and the stator winding.

Further preferably, the sheet is a high thermal conductivity insulating groove paper or a high thermal conductivity silicone pad.

Further preferably, the sheet has a thermal conductivity >0.5 W/(m·K), an insulation strength >10 kV/mm, and a thickness of 0.1 to 0.5 mm.

Further preferably, the condensation section of the 3D phase change heat pipe and the assembly passages are matched by a eutectic welding, expansion joint or glue bonding process.

Further preferably, the 3D phase change heat pipe is a copper heat pipe or an aluminum heat pipe.

Further preferably, the 3D phase change heat pipe may be a variety of heat pipes such as a sintered wick type heat pipe, a micro groove type heat pipe, a hybrid heat pipe or the like.

The 3D phase change heat pipe is a sintered wick type heat pipe, a micro groove type heat pipe or a hybrid heat pipe.

Further preferably, a wick or a groove structure in the 3D phase change heat pipe may be in various shapes such as an annular shape, a pyramid shape, a zigzag shape, a trapezoid shape or the like. Several threaded holes are formed on both end faces of the casing body to achieve connection with a flange end cap.

Compared with the prior art, the present invention has the following advantages:

1. In the present invention, a 3D phase change heat pipe is used as a heat conduction and heat equalizing component. The phase change heat pipe has extremely efficient heat transfer capacity, and has a thermal conductivity tens of thousands times of known metals, enabling rapid recombination of the heat distribution inside the drive motor. Mounting the 3D phase change heat pipe in the casing assembly passages allows a large amount of heat originally concentrated on the stator winding and the stator core to rapidly propagate and spread to the entire casing to eliminate the local overheating problem, greatly reducing the overall temperature difference gradient of the motor, realizing the heat distribution reorganization, and achieving better temperature control performance of the driving motor.

2. The 3D phase change heat pipe of the present invention is matched with the assembly passages at the casing by a eutectic welding, an expansion joint or a glue bonding process. The contact thermal resistance can be controlled at a lower level to effectively improve the temperature control performance of the drive motor.

3. The present invention can facilitate the design of the electromagnetic performance of the motor to the higher power density by improving the temperature control performance of the driving motor. At the same time, the use of the stator core silicon steel sheet and the stator winding copper coil material can be further reduced, and the purpose of reducing the weight and cost of the motor component can be achieved.

4. The present invention has the advantages of simple structure, simple process, convenient installation and low cost, and can be applied to all the permanent magnet synchronous motors for vehicles in the market.

DETAILED DESCRIPTION OF THE PRESENT INVENTION

The detailed description of the present invention is further described below in conjunction with the accompanying drawings and examples. The implementation and protection of the present invention are not limited thereto. It should be noted that any process or parameter that is not specifically described below can be achieved by those skilled in the art with reference to the prior art.

Figure 1:
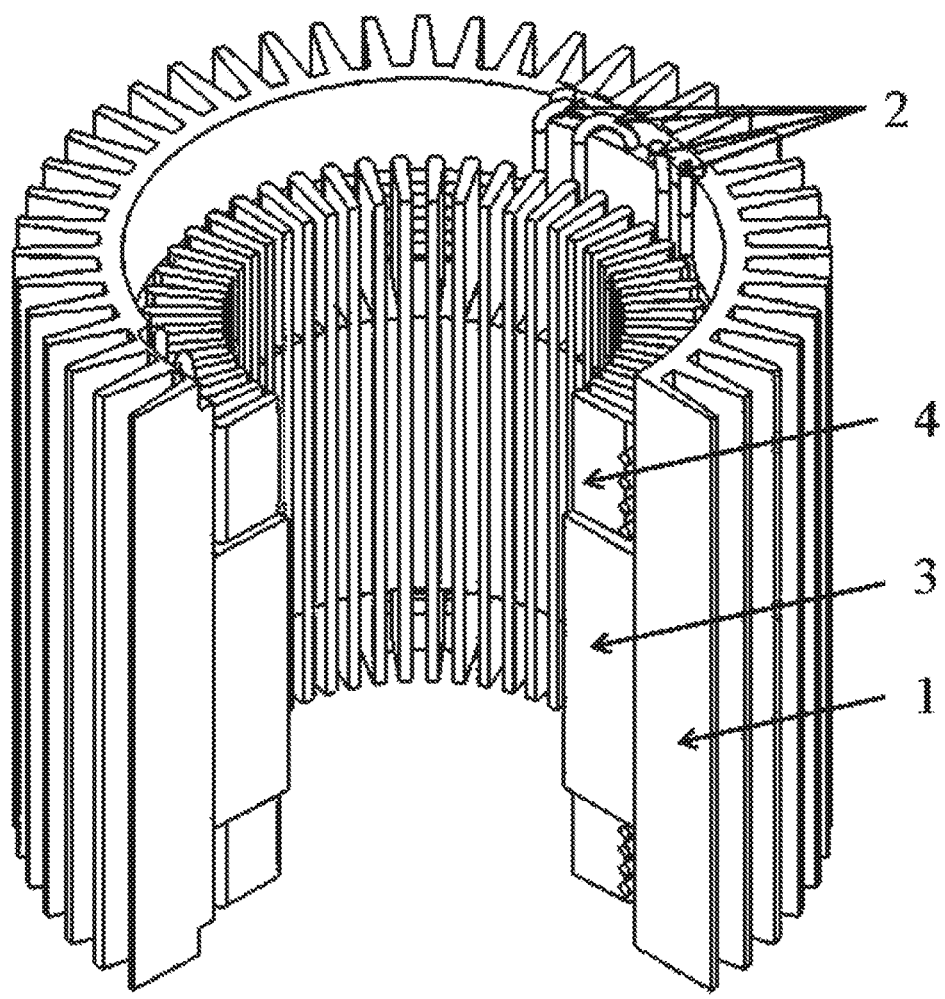
FIG. 1 is a stereoscopic sectional view of a high thermal conductivity stator component for vehicle motor based on 3D phase change heat pipe technology in an embodiment.
Figure 2:
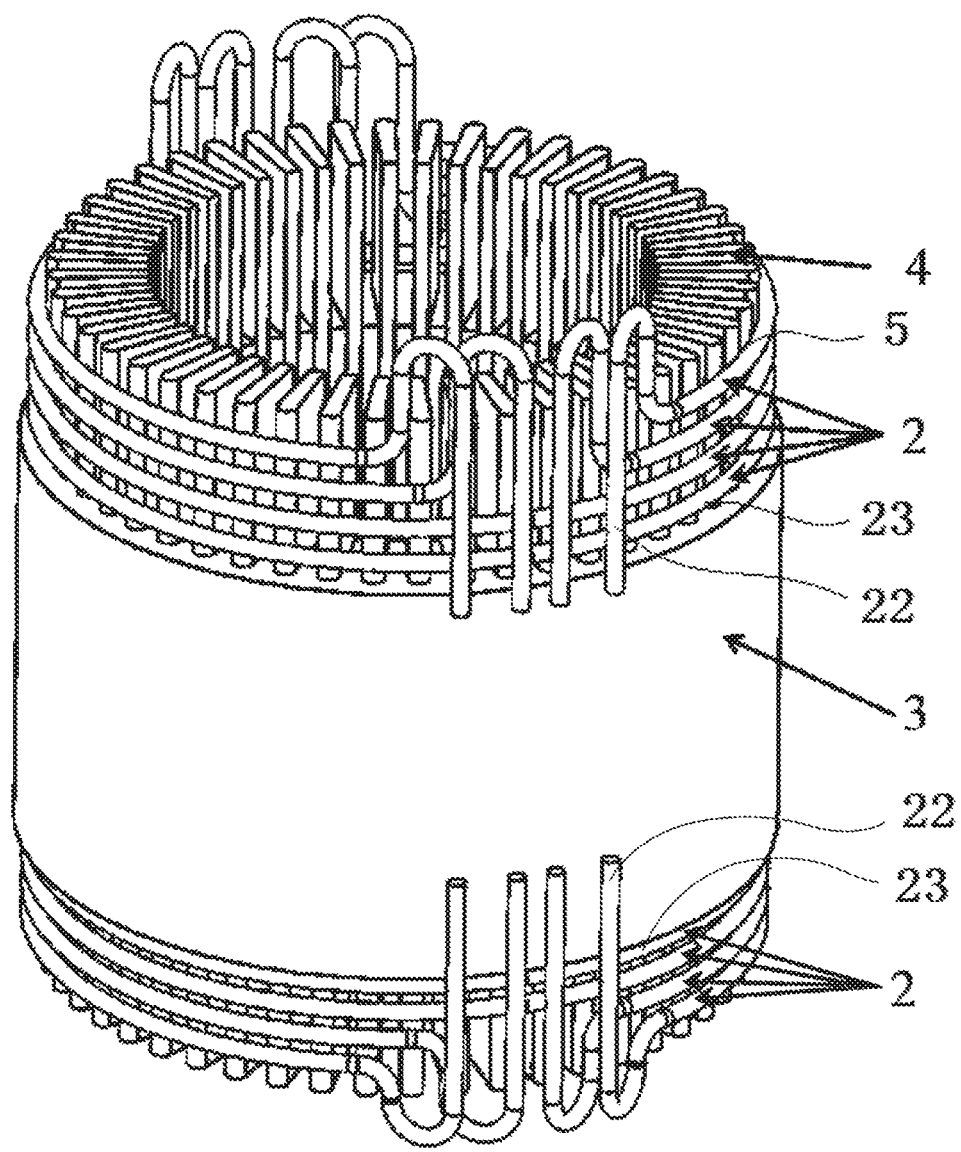
FIG. 2 is an assembly diagram of FIG. 1 after removing the casing.
Figure 3:
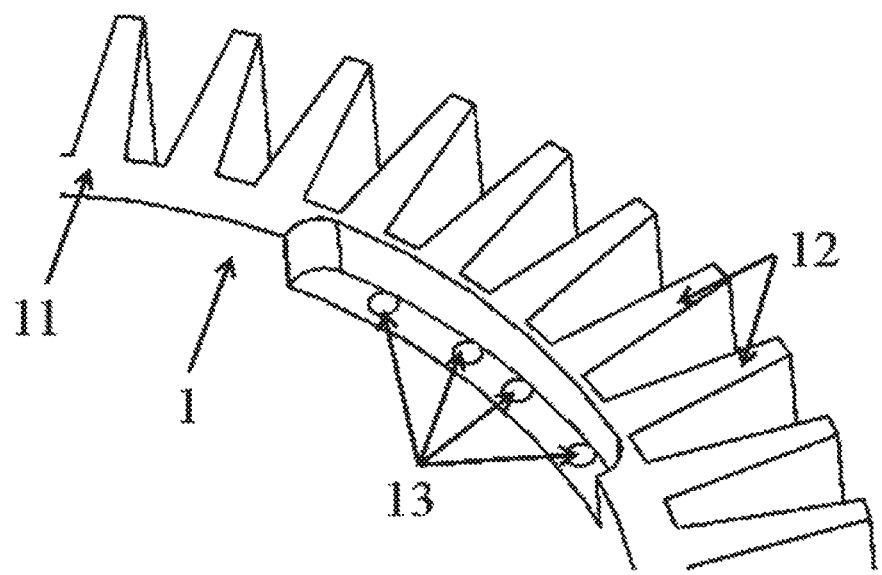
FIG. 3 is a stereoscopic view of a fin set casing which is a component in FIG. 1.

As shown in FIGS. 1-3, in one embodiment of a high thermal conductivity stator component for vehicle motor based on 3D phase change heat pipe technology, the air-cooled motor includes a fin set casing 1, a 3D phase change heat pipe 2, a stator core 3, and a stator winding 4.

The fin set casing 1 is formed with the aluminum material A6061 by an integrated extrusion molding process. The fin set casing 1 includes a casing body 11, a heat dissipating fin set 12, and 3D phase change heat pipe assembly passages 13. The casing body is annular.

The heat dissipating fin set 12 is uniformly arranged in a circumferential direction on a circular outer surface of the casing body 11, and a total of 48 heat dissipating fins are extrusion molded. The stator core 3 and the stator winding 4 are located on an inner circular surface of the casing body 11.

The 3D phase change heat pipe 2 includes a condensation section 22 and an evaporation section 23, where the condensation section 22 is assembled in the assembly passages 13, and the evaporation section 23 is wound around the outside of the stator winding 4 and bonded to the stator winding 4. A sheet 5 with high thermal conductivity and high insulation performance is inserted between the evaporation section 23 and the stator winding 4.

The 3D phase change heat pipe assembly passages 13 are in a blind hole structure, and are symmetrically arranged on both sides of the casing body. There are a total of 16 3D phase change heat pipe assembly passages 13. In this embodiment, the cross-sectional shape of the 3D phase change heat pipe assembly passages 13 is designed to be circular.

Figure 4:
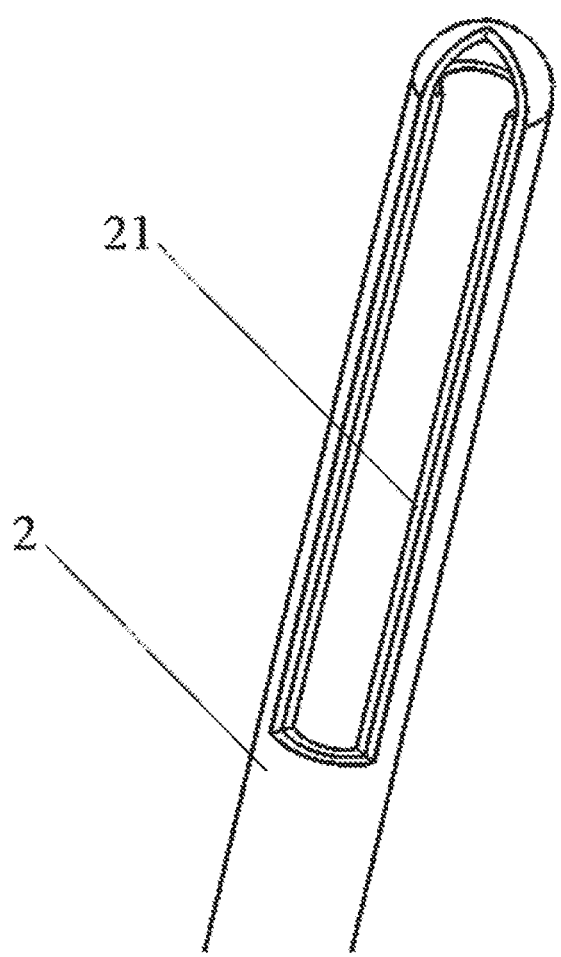
FIG. 4 is an end stereoscopic sectional view of a 3D phase change heat pipe which is a component in FIG. 1.

As shown in FIG. 4, a copper heat pipe with a sintered wick is used as the 3D phase change heat pipe 2. The 3D phase change heat pipe 2 has a cylindrical shape, and the inner wick 21 has an annular structure and has a circular cross section.

The 3D phase change heat pipe 2 is closely matched with the heat pipe assembly passages 13 by a low temperature welding process.

Only as an example, the specific molding and assembly process of the high thermal conductivity stator component for vehicle motor is as follows: A6061 aluminum material is integrally extrusion molded in a die to obtain the fin set casing 1; the fin set casing 1 is placed on the machining center for milling the 3D phase change heat pipe assembly passages 13, and then is finished to remove the burr burrs, followed by a water flow rinsing process to remove the aluminum chips and the coolant on the heat dissipation fin set 12; thereafter, the fin set casing 1 is placed in an oven for baking to remove moisture and cooled to room temperature; the fin set casing 1 is placed in a high frequency induction heating machine for heating to cause thermally expansion of the aluminum material, by the heating, the stator core component (stator core and stator winding) that has been completed with the winding process is heat-sleeved in the fin set casing 1 to achieve close match between the stator core component and the fin set casing 1; the surface of the 3D phase change heat pipe 2 is smoothed and uniformly coated with a thin layer of low temperature solder paste onto the surface of the condensation section of the 3D phase change heat pipe 2; the condensation section of the 3D phase change heat pipe 2 is embedded into the 3D phase change heat pipe assembly passages 13 at a constant speed, with straight pipe pressure tools if necessary; the evaporation section of the 3D phase change heat pipe is wound around the outside of the stator winding and bonded to the stator winding, the intermediate contact area is separated by a 0.2 mm thick high thermal conductivity electrically insulating silicone pad, then applied with insulating varnish and processed by the heat curing operation; the whole fin set casing 1 embedded with the 3D phase change heat pipe 2 is placed in a high temperature oven with the temperature and heat preservation time set according to the soldering process requirement of the low temperature solder paste, and the 3D phase change heat pipe 2 is welded and fixed; finally, the bundled and welded high thermal conductivity stator component for vehicle motor based on 3D phase change heat pipe technology is cleaned to obtain the final product.

In operation, the 3D phase change heat pipe 2 installed between the 3D phase change heat pipe assembly passages 13 and the stator winding of the casing can rapidly propagate and spread a large amount of heat originally concentrated on the stator winding and the stator core to the entire casing. Thereby, the local overheating problem is eliminated, the temperature gradient of the motor is greatly reduced, heat distribution reorganization is realized, and better temperature control performance of the driving motor is achieved.

The above embodiments are merely illustrative of one implementation of the present invention, and are specifically described in details, which, however, are not to be construed as limiting the scope of the present invention. It should be noted that a number of variations and modifications may be made by those skilled in the art without departing from the spirit and scope of the present invention. The scope of the present invention is to be determined by the appended claims.

What is claimed is:

1. A high thermal conductivity stator component for vehicle motor based on 3D phase change heat pipe technology, comprising a fin set casing, a 3D phase change heat pipe, a stator core and a stator winding, wherein: the fin set casing comprises a casing body, a heat dissipating fin set, and assembly spaces for the 3D phase change heat pipe; the casing body is annular, and the heat dissipating fin set is uniformly arranged on an outer surface of the casing body in a circumferential direction; the stator core and the stator winding are located on air inner surface of the casing body; the 3D phase change heat pipe comprises a condensation section and an evaporation section, the condensation section being assembled in the assembly spaces, the evaporation section being wound around an outside of the stator winding and being bonded with the stator winding; a number of the spaces is more than one; a sheet with high thermal conductivity and high insulation performance is inserted between the evaporation section and the stator winding; the condensation section is matched with the spaces by a eutectic welding, expansion joint or a glue bonding process; the spaces having a circular, rectangular or curved cross section are blind holes and are symmetrically arranged on both sides of the casing body; and the 3D phase change heat pipe is closely matched with the spaces.

2. The high thermal conductivity stator component for vehicle motor based on 3D phase change heat pipe technology according to claim 1, wherein the fin set casing is formed with aluminum or steel material by integrated casting or extrusion molding process.

3. The high thermal conductivity stator component for vehicle motor based on 3D phase change heat pipe technology according to claim 1, wherein the sheet is a high thermal conductivity insulating groove paper or a high thermal conductivity silicone pad.

4. The high thermal conductivity stator component for vehicle motor based on 3D phase change heat pipe technology according to claim 1, wherein the sheet has a thermal conductivity >0.5 W/(m·K), an insulation strength >10 kV/mm, and a thickness of 0.1 to 0.5 mm.

5. The high thermal conductivity stator component for vehicle motor based on 3D phase change heat pipe technology according to claim 1, wherein the 3D phase change heat pipe is a copper heat pipe or an aluminum heat pipe.

6. The high thermal conductivity stator component for vehicle motor based on 3D phase change heat pipe technology according to claim 1, wherein the 3D phase change heat pipe is a sintered wick type heat pipe.

7. The high thermal conductivity stator component for vehicle motor based on 3D phase change heat pipe technology according to claim 1, wherein a wick in the 3D phase change heat pipe has a circular cross section.

* * * * *